United States Patent [19]

Ziegel et al.

[11] 4,029,370

[45] June 14, 1977

[54] PORTABLE SAFE

[76] Inventors: Olivier Ziegel; Liliane Ziegel, both of 66, Boulevard Malesherbes, 75008 Paris, France

[22] Filed: Sept. 26, 1975

[21] Appl. No.: 617,183

[30] Foreign Application Priority Data

Oct. 2, 1974 France ............................ 74.33167
July 25, 1975 France ............................ 75.23289

[52] U.S. Cl. ............................ 312/284; 248/206 R; 109/51

[51] Int. Cl.$^2$ .................. A47B 97/00; F16B 47/00; E05G 1/04

[58] Field of Search ....... 312/284; 248/362, 206 R, 248/203, 226 R; 109/50, 51, 52

[56] References Cited

UNITED STATES PATENTS

| | | | |
|---|---|---|---|
| 1,297,492 | 3/1919 | Rauwald et al. | 109/51 |
| 1,686,551 | 10/1928 | Carmichael | 248/226 R |
| 2,291,811 | 8/1942 | Johnson | 248/203 |
| 2,553,333 | 5/1951 | Schachter | 248/226 A |
| 2,677,338 | 5/1954 | Sassetti | 109/51 |
| 2,935,955 | 5/1960 | Mann, Jr. | 109/50 |
| 2,968,460 | 1/1961 | Van Dusen | 248/206 R |
| 3,013,688 | 12/1961 | Luning | 248/362 |
| 3,159,370 | 12/1964 | Rubinstein | 248/346 |
| 3,750,991 | 8/1973 | Ragir | 248/206 R |
| 3,858,531 | 1/1975 | Rubinstein | 109/52 |

FOREIGN PATENTS OR APPLICATIONS

| | | | |
|---|---|---|---|
| 581,529 | 7/1933 | Germany | 248/362 |

*Primary Examiner*—Paul R. Gilliam
*Assistant Examiner*—Victor N. Sakran
*Attorney, Agent, or Firm*—Lewis H. Eslinger

[57] ABSTRACT

The portable safe includes a base containing means for securing the safe to a support surface and a cover for the base to protect the securing means and valuables therein. A lock is provided to lock the cover to the base. The securing means, in one embodiment, is a suction cup on the base which is selectively operated, to produce stretching and a strong suction grip in the cup, by a lever located in the base. An anti-slip lining can be provided on the base around the suction cup to prevent the safe from being slid off of the support surface.

14 Claims, 8 Drawing Figures

PORTABLE SAFE

The present invention relates to a box adapted to protect small articles from theft, and in particular to a portable safe which is useful to travelers.

Travelers are often reluctant to carry valuables, such as cash or jewelry, with them for fear of theft if the valuables are left in a hotel room. Thus they either leave these items at home or must deposit them with a bank or the hotel management. This is often an inconvenience, as most travelers realize.

It is an object of the present invention to provide a portable safe in which small items of value can be kept.

It is another object of the present invention to provide a portable safe which a traveler can safely leave in his hotel room.

It is a further object of the invention to provide a portable safe which is difficult to remove once secured to a support surface.

Another object of the present invention is to provide a portable safe which is durable in construction, yet economical to manufacture.

In accordance with an aspect of the invention the portable safe includes a base adapted to be removably but firmly secured to a support surface by means located within the base and accessible only through the inside of the safe. The base cooperates with a cover that is removably secured to the base to form an enclosure in which valuables may be placed and which encloses and protects the securing means. A lock is also provided to lock the cover to the base.

In one embodiment of the invention the securing means consists of a suction cup secured at its center to an oscillating lever located within the base. When the lever is operated it stretches the suction cup to produce a powerful suction on the support surface to which the safe is to be secured. Preferably the suction cup is surrounded by an anti-slip lining on the base to prevent the safe from being slid off of the support surface (e.g. over the edge of a table).

The above, and other objects, features and advantages of the present invention will be apparent in the following detailed description of an illustrative embodiment thereof which is to be read in connection with the accompanying drawings, wherein.

Figure 1:
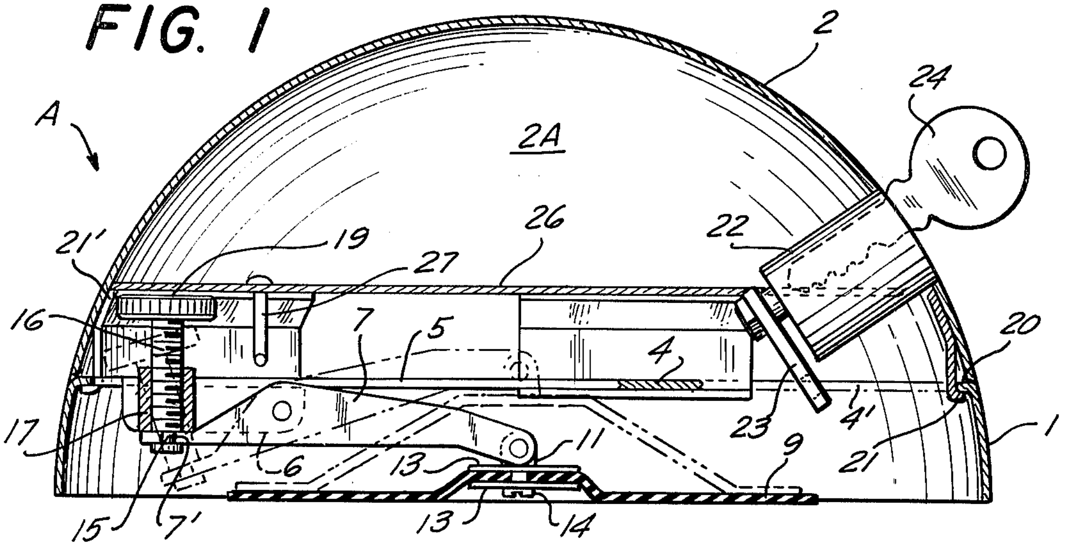
FIG. 1 is an elevational view, in section, of one embodiment of the portable safe of the present invention.
Figure 2:
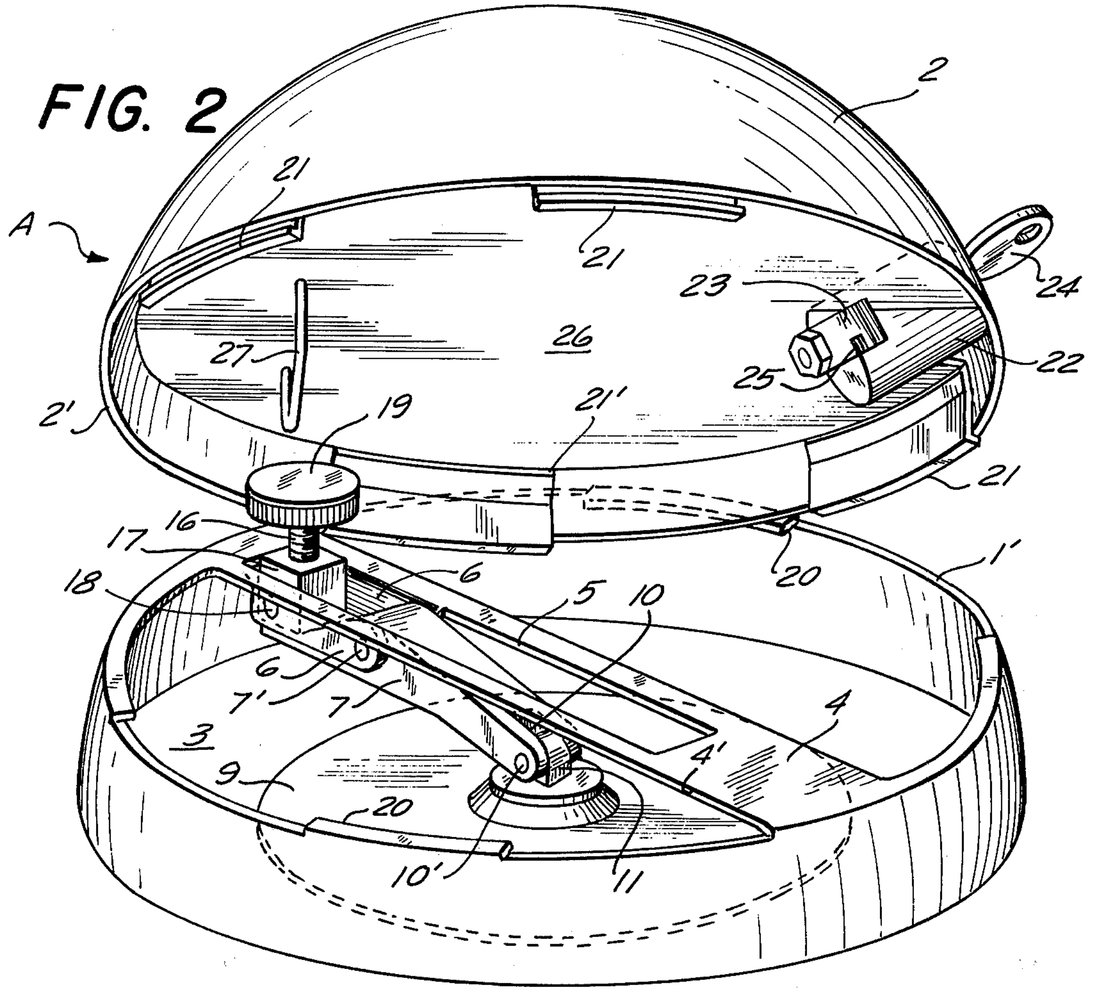
FIG. 2 is a perspective view of the cover and base of the safe of FIG. 1 as it is being opened.

Referring now to the drawings in detail and initially to FIGS. 1 and 2 thereof, the portable safe A, constructed in accordance with one embodiment of this invention, includes a base 1 and a cover 2 which cooperate to form a generally hemispherical enclosure. Preferably the base and cover are formed of a hard, smooth and/or highly polished metal such as stainless steel.

The base 1 forms the lower portion of the enclosure and, as seen in FIG. 2, has two opened, opposite plane sides, the lower one of which preferably has a diameter equal to the diameter of the hemispherical enclosure. The upper or opposite side of the base has a smaller diameter defining a rim 1′ on which the cover 2 is placed. The cover forms the remainder of the hemispherical enclosure and has a lower circular edge 2′ whose diameter is equal to the diameter of rim 1′.

Base 2 has a diametrically extending cross piece or support bar 4 located therein adjacent rim 1′. This cross piece is preferably formed integrally with base 1 but it can be a separate member secured rigidly in the base in any convenient manner. In any case, the cross piece 4 has a rectangular opening 5 formed therein. One end of the opening 5 is boundedby a pair of spaced lugs or ears 6 which are integral with and extend downwardly from cross piece 4.

A lever 7 is pivotally mounted intermediate its ends by a pivot pin 7′ on lugs 6. One end of the lever 7′ is secured to the central portion of a relatively large suction cup 9 to aid in producing a suction grip by the cup. As seen in FIG. 2, the end of lever 7 adjacent suction cup 9 is forked, in the manner of a clevis, and is pivotally connected at 10′ to a shank 11. As seen in FIG. 1, washers 13 are located on opposite sides of cup 9 and a screw 14 extends through the cup and washers into shank 11, thereby securing the cup to the lever for movement therewith.

The opposite end of lever 7, remote from cup 9, has an unthreaded bore 7″ formed therein which rotatably receives the unthreaded end of a screw 16. The latter is threadably engaged with, and extends through, a nut or trunnion 17. This nut is pivotally mounted by pins 18 in the lugs 6 on cross piece 4, as seen in FIG. 2.

Screw 16 may be provided with a knurled knob 19 so that it can be manually rotated by the traveler. Thus, to secure the base of the safe to a support surface the traveler places the safe on the support surface. The knob 19 is then rotated to drive the lever 7 from its solid line position shown in FIG. 1 to its dotted line position whereby the central portion of the suction cup is raised. This greatly increases the suction grip produced by cup 9 on the support surface, thus preventing removal of the base from the support surface until the lever 7 is returned to its original position.

The upper rim 1′ of base 1 is provided with integral regularly spaced projections 20 bent inwardly of the base's side wall. These projections cooperate with hooks 21 secured to the interior of cover 2 to hold the cover on the base. Thus, as seen in FIG. 1, the hooks 21 are positioned to engage the lower side of projections 20. Of course, when the cover is placed on base 1 it is positioned so that the hooks 21 are placed in the spaces between projections 20 and then the cover is rotated to place the hooks below the projections. The projections may have extensions which will limit rotation of the cover beyond a predetermined point. However in the illustrative embodiment the integral cross piece serves this function.

A lock 22 is provided in cover 2 for locking the cover to base 1. The lock includes a rotating latch 23 which is turned by the key 24. Latch 23 has a notch 25 formed in its free end so as to engage the edge 4′ of cross piece 4 after cover 2 is rotated into position and key 24 is turned. The engagement of latch 23 with cross piece 4 prevents the cover 2 from being turned in the "off" direction, i.e. in a direction to disengage the projections or shoulders 20 and hooks or lugs 21.

In this embodiment of the present invention cover 2 forms the container in which objects are to be stored. The cover is fitted with a circular plate 26 which is removably seated on the upper edges 21' of hooks 21. The plate has a notch formed therein to accommodate lock 22 and includes a handle 27 which enables the user to remove the plate when access to valuables in the space 2A is desired.

From the above it is seen that the safe A is relatively simple to operate and to secure rigidly on a support surface. The lever 7 is operated, as described above, to increase the suction force of the cup 9 to secure the entire device to the support surface. Access to the interior can then only be obtained by operating the lock 22 with key 24 and thereafter rotating the cover to disengage projections 20 and hooks 21. The latter ensure a firm connection between the cover and base preventing the cover from being pried away from the base with a prying tool. Moreover because the base and cover are formed of metal they can be closely matched at rims 2', 1' so that the joint therebetween does not provide an opening or space allowing insertion of a prying tool. In addition, since the entire safe is semispherical and has a smooth polished surface, a good hand hold or purchase cannot be obtained on it. This makes it almost impossible to remove the safe from the support surface to which it is secured.

Although the previously described embodiment discloses the presently preferred usage of a suction cup to secure the base 1 to a support surface, it is contemplated that an electromagnet can be placed in base 1, in lieu of the suction cup, powered by batteries in the base, for securing the safe to a metal surface.

Figure 7:
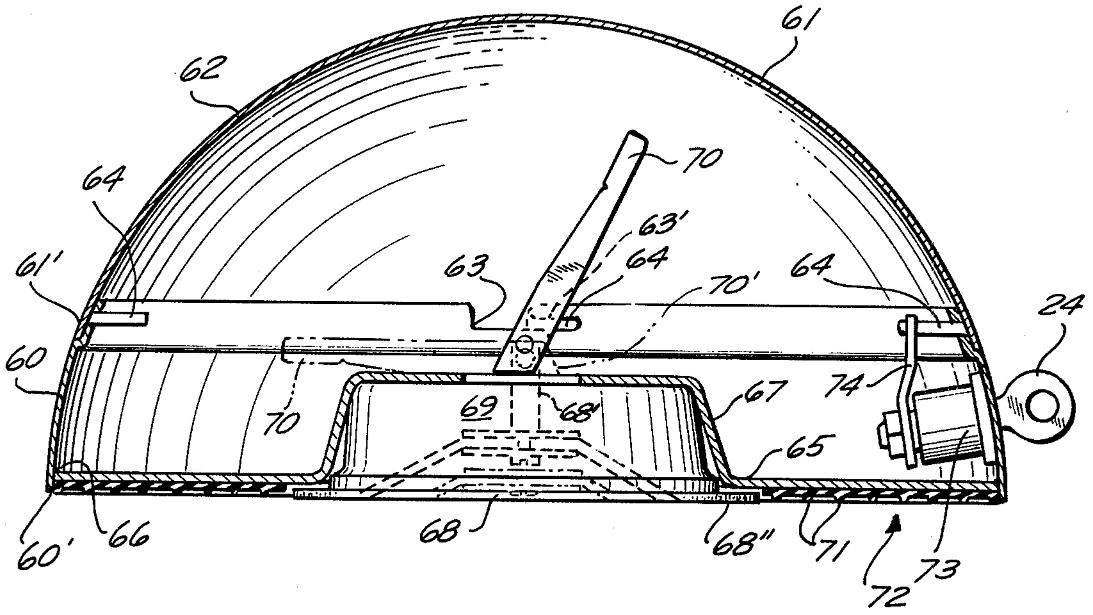
FIG. 7 is an elevational view similar to FIG. 1 of another embodiment of the invention.
Figure 8:
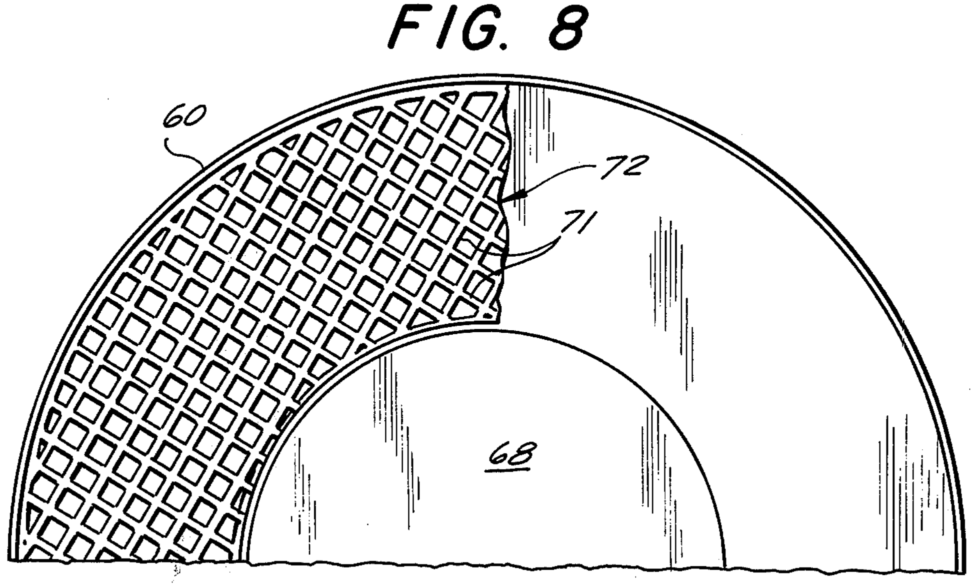
FIG. 8 is a partial bottom view of the safe shown in FIG. 7.

The embodiment of the invention illustrated in FIGS. 7 and 8 is a modification of the previously described embodiment of the safe A. As seen therein the safe includes a base 60, corresponding to previously described base 1, which cooperates with a cover 61. The base has an annular rim 62 formed at its upper edge, with the rim being offset slightly inwardly to accommodate the lower edge or rim 61' of cover 61, thereby leaving the exterior surface of the safe smooth.

The rim 62 has at least three notches 63 formed therein which define shoulders 63'. These notches receive the lugs 64, which project radially inwardly from cover 61. After the lugs are placed in notches 63 the cover is rotated to move the lugs below shoulders 63' in a bayonet type lock.

Base 60 is provided with a bottom wall 64 rigidly secured or integrally formed therewith. This bottom wall is spaced upwardly slightly from the bottom edge 60' of the base 60 in order to form a thin recess or space 66 between the bottom wall and the support surface on which the safe is to be secured.

Bottom wall 65 includes a recess 67 which receives a suction cup 68 therein. The center of the suction cup is connected to a shank 68' (shown in dotted lines) in any convenient manner, e.g. in the same manner as suction cup 9 of the embodiment of FIG. 1. This shank is pivotally connected to a manually operated lever 70. The lever has a cam surface 70' of predetermined configuration which cooperates with the upper surface of wall 65 to the raised center portion of cup 68 when the lever is pivoted from the phantom line position in FIG. 7 to the solid line position, thereby producing a powerful suction force with the cup.

The space 66 provided by wall 65 accommodates the periphery 68'' of the suction cup and also receives an annularly shaped anti-slip liner 71 (formed of grooved rubber or plastic). The liner is secured to wall 65 by an adhesive or the like and defines ridges 72 which extend slightly beyond the lower edge 60' of base 60 to frictionally engage the support surface on which the safe is placed, thereby to resist sliding movement of the safe after the suction cup 68 is activated. The liner also prevents a prying instrument from being inserted under the safe and reaching the suction cup and release the suction therein. Thus even if a prying instrument is inserted under the edge of the base, the liner blocks further insertion and prevents the prying instrument from reaching the suction cup.

Base 60 also includes a lock 73 having a rotating latch 74 activated by key 24. When the cover 61 is placed on base 60 and rotated to engage lugs 64 beneath shoulders 63, the latch 74 can be turned by key 24 to block one of the lugs 64 and prevent the cover 61 from being rotated in an opposite direction in notches 63, thereby preventing removal of the cover from the base. Accordingly valuables can be placed in base 60 and cover 61 can be locked therein. Access to the interior of the safe is then prevented by actuation of lock 73. It also prevents access to lever 70 so that the suction force produced by cup 68 cannot be released. This force is substantial and prevents removal of the entire safe from the support surface to which it is secured.

The embodiment of the invention as illustrated in FIGS. 3–6 is adapted to be rigidly secured to a shelf, table top, or the like having two opposed parallel surfaces. In this case the safe is provided with a base 30 in the shape of a yoke, i.e. the base has lower and upper legs 31, 32. Leg 31 has a smooth scoop shaped configuration while upper leg 32 is generally rectangular and located within a cover 46. The legs define a rectangular slot 32' therebetween which is adapted to receive the edge of a shelf E.

A pair of metal blocks 33, 34 are welded into leg 32 at the front corners, 33', 34' thereof. These blocks have threaded bores formed therein which threadably receive clamping screws 35, 36 having knurled knobs 37, 38 secured thereto. The free, unthreaded lower ends of these screws are rotatably received in a front clamping plate 39. By rotating screw 35, 36, plate 39 can be tightly engaged against shelf E to clamp the shelf between plate 39 and leg 31.

A third metal block 40 is welded to the rear portion 40' of leg 32. This block also has a threaded bore formed therein to receive a third clamping screw 41 (which can be of a smaller diameter than screws 35, 36) that has a knurled knob 42 secured thereto. The free, unthreaded lower end of screw 41 is rotatably received in a clamping plate 43. The latter includes a hinge 44 element having a pivot pin 52 mounted therein.

As in the prior embodiments cover 46 has a smooth, polished surface and a rounded shape in order to afford as little a hold or grip as possible.

The front 46' of the cover includes a lock 47 having a rotatable latch 48 operated by the lock's key. This latch is notched to receive a lug 49 formed in the clamping plate 39 to lock the cover when it is pivoted to its closed position.

The rear 46'' of the cover has a U-shaped frame element 50 secured thereto. The legs of this element have inclined slots formed therein, as at 51, to engage the pivot shaft 52 of hinge 44 and thus secure the cover to the base. When the slots are positioned over pin 52 and lock 47 operated, the cover 46 cannot be removed.

As mentioned, the safe of this embodiment is placed on a shelf by inserting the edge of the shelf in the slot 32' between legs 31 and 32. Thereafter, with cover 46 removed the screws 35, 36 and 41 are tightened to press plates 39, 43 against the adjacent surface of shelf E, clamping the shelf between these plates and leg 31. Then the objects to be protected are placed within leg 32, and cover 46 is positioned with the slots 51 in element 40 engaging pin 52. With the cover in place, the box can be locked by operating lock 47.

Figure 5:
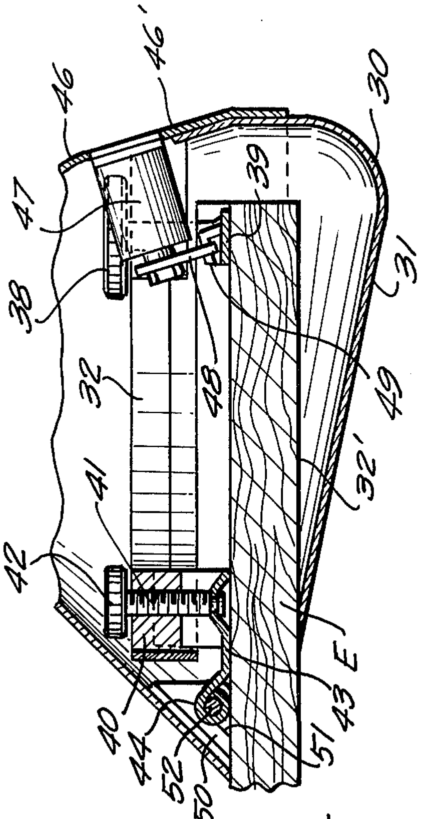
FIG. 5 is a sectional view taken along line 5—5 of FIG. 3.
Figure 6:
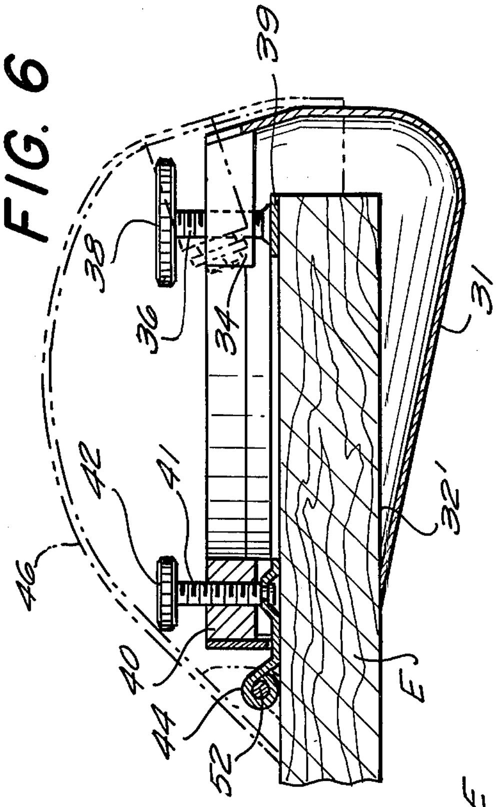
FIG. 6 is a view similar to FIG. 5 but showing the safe attached to a thicker shelf.
Figure 3:
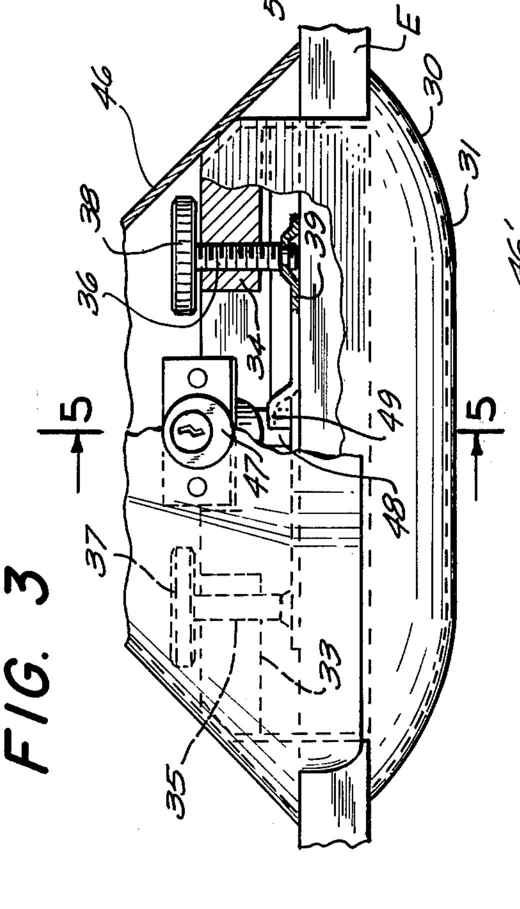
FIG. 3 is a partial front elevational view, with parts broken away of another embodiment of the present invention.
Figure 4:
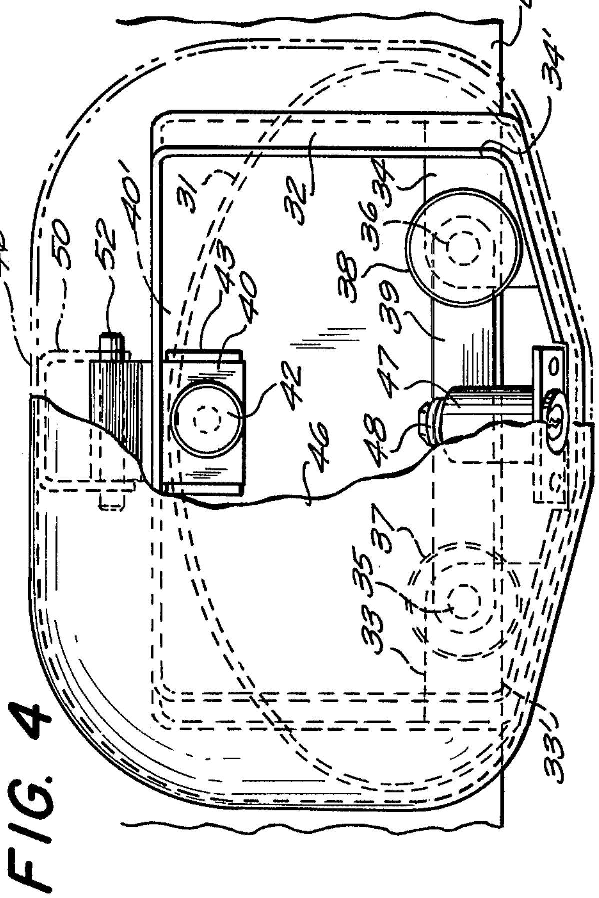
FIG. 4 is a top plan view, with parts broken away, of the safe shown in FIG. 4.

FIGS. 5 and 6 illustrate the same safe applied to shelves E of different thicknesses. By this arrangement the portable safe is securely affixed to the shelf and cannot be removed without opening cover 46.

Although several illustrative embodiments of the invention have been described with reference to the accompanying drawings it is to be understood that various modifications and changes can be made thereto by those skilled in the art, without affecting the scope or spirit of this invention.

What is claimed is:

1. A portable safe comprising, a base, a suction mounted in said base and having a suction surface directed outwardly from the base for engagement with a smooth support surface for securing the base to said smooth support surface, a cover for said base, said cover and base having cooperating means for removably securing the cover to the base, and cooperating to define a chamber within said safe, lock means for locking the cover to the base, and means mounted entirely within said chamber in the confines of said base and accessible only upon removal of said cover for selectively displacing the center of the suction cup inwardly of the base thereby to stretch the suction cup and produce a strong gripping force on the support surface.

2. The portable safe as defined in claim 1 wherein said means for displacing the center of the suction cup comprises a lever pivotally mounted within said base and operatively connected to the center of the suction cup.

3. The portable safe as defined in claim 2 wherein said base has a lever support bar therein, said lever being pivotally mounted on said bar intermediate its ends and having one end pivotally connected to the center of said suction cup and selectively operable means at its opposite end for pivoting and thereby displacing said one end of the lever.

4. The portable safe as defined in claim 3 wherein said selectively operable displacing means includes a nut pivotally mounted on said support bar and a screw threadably engaged in said nut and having a free end freely rotatably mounted in said opposite end of the lever, whereby rotation of the screw causes pivotal movement of said lever.

5. The portable safe as defined in claim 2 wherein said base includes a bottom wall and said lever has a cam surface of predetermined configuration formed on one end thereof and engaging said bottom wall, said suction cup including a stem element extending through said bottom wall and being pivotally connected to said lever, said predetermined cam surface of said lever being selected to pull the center of the suction cup upwardly into the base as it is moved against said bottom wall from a first to a second position.

6. The portable safe as defined in claim 2 wherein said base and cover are shaped to form a generally semispherical enclosure, said base being formed as a segment of a sphere having two plane opposite sides with one side, adjacent the plane of said suction cup, having the major diameter of the safe; and said cover being formed to cooperate with the base and form the generally semispherical enclosure.

7. The portable safe as defined in claim 6 wherein said base and cover have high polished smooth exterior surfaces whereby a good purchase or grip on the safe cannot be obtained.

8. The portable safe as defined in claim 6 wherein said cooperating means on the base and cover comprise cooperating hooks and shoulders arranged to cooperate with each other upon rotation of the cover on the base to secure the cover thereto.

9. The portable safe as defined in claim 8 wherein said hooks and shoulders are arranged to prevent relative rotation in one direction when engaged; and said lock means includes means for preventing rotation of the cover in an opposite direction.

10. The portable safe as defined in claim 2 wherein said base includes a bottom wall, said suction cup being located on the base on the outside of said bottom wall for engaging a support surface; and an anti-slip lining surrounding said suction cup and secured to said bottom wall to resist sliding movement of the safe when the safe is secured by the suction cup to the support surface.

11. The portable safe as defined in claim 10 wherein said base has a bottom edge positioned against said support surface when the safe is secured thereto; said bottom wall being located inwardly of said bottom edge in the base to provide a hollow space below the bottom wall and between that wall and said bottom edge for receiving said lining whereby the bottom edge of the base will be in extremely close proximity to the support surface, thereby to prevent a prying tool from being inserted between the base and the support wall.

12. The portable safe as defined in claim 11 wherein said bottom wall includes a central well in which said suction cup is located.

13. The portable safe as defined in claim 12 wherein said base and cover are generally circular in plan, said base having an upper edge defining an offset rim including a plurality of notches therein; said cover having a lower edge receiving said rim and including generally radially and inwardly extending lugs thereon for cooperation with said notches to form a bayonet lock; said notches and lugs defining said cooperating means.

14. The portable safe as defined in claim 13 wherein said lock means includes a rotating latch mounted in said base to block one of said lugs against rotation in the locked position of the lock, thereby to prevent removal of said cover from the base.

* * * * *